April 15, 1958 F. H. GUTH 2,831,159
MAGNETIC AMPLIFIER
Filed Sept. 9, 1953
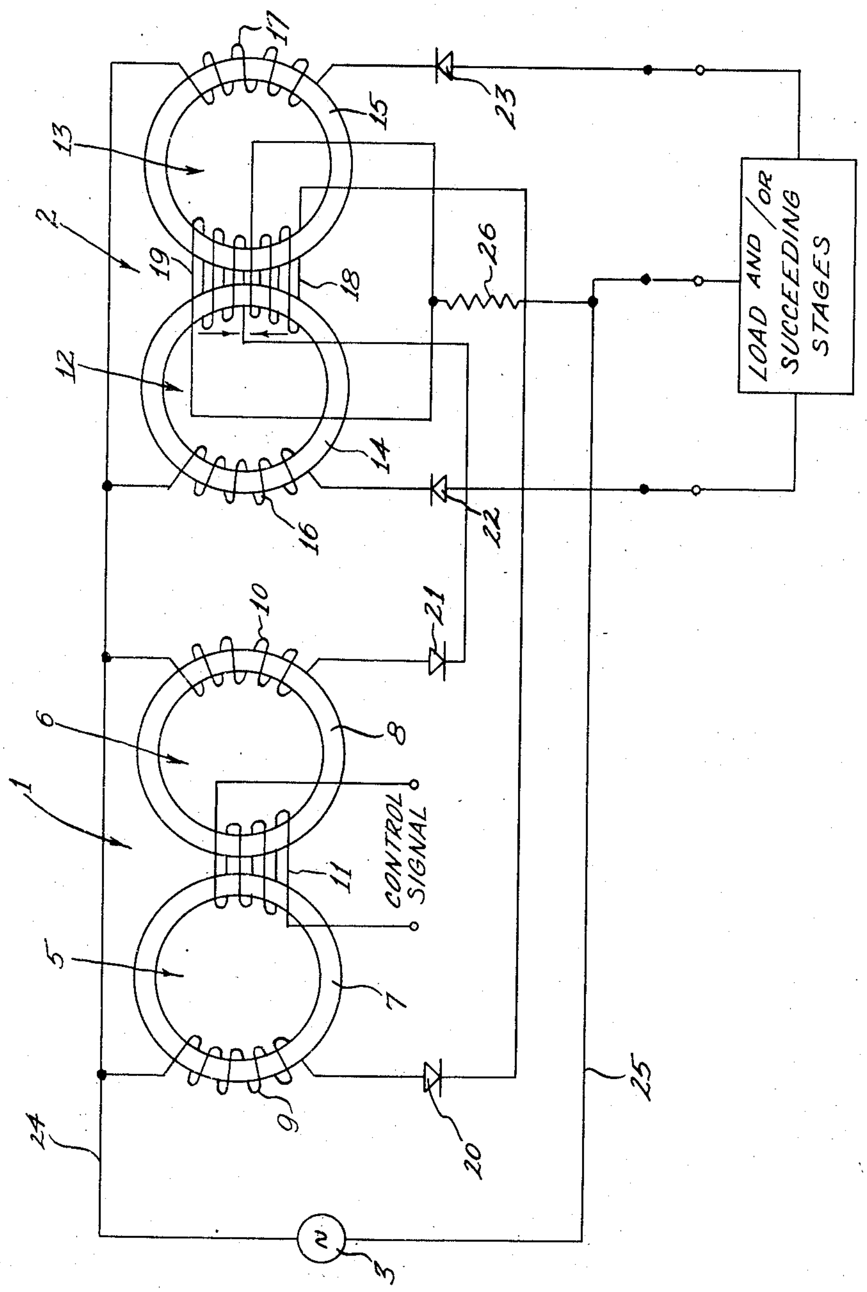
Inventor
FRED H. GUTH
by Hill, Sherman, Meroni, Gross & Simpson Attys.

United States Patent Office 2,831,159

Patented Apr. 15, 1958

2,831,159

MAGNETIC AMPLIFIER

Fred H. Guth, Warrensville Heights, Ohio, assignor to Thompson Products, Inc., Cleveland, Ohio, a corporation of Ohio Application September 9, 1953, Serial No. 379,204

1 Claim. (Cl. 323—89)

The present invention relates to a magnetic amplifier and more particularly to a half wave magnetic amplifier of simplified and improved construction.

Because of their ruggedness and reliability, magnetic amplifier systems have come into great demand within recent years. In many instances, however, where it was found desirable to use a magnetic amplifier type system, such systems could not be employed since they had certain inaccuracies and extended time delay characteristics.

The response time characteristics in many heretoknown amplifier systems was a source of considerable consternation since many of the systems had time delay on the order of ten to twenty or more cycles of the input frequency.

Another difficulty which had confronted attempted utilization of magnetic amplifier networks and systems is the complexity of their construction and the large number of electrical component parts required, particularly in magnetic amplifier systems having cascaded stages.

By the system of the present invention, however, I am able to obviate these difficulties and provide a simplified economical magnetic amplifier system having a greatly reduced period of response on the order of one cycle for the first stage and one-half cycle for each succeeding stage. Therefore, a magnetic amplifier built in accordance with the principles of the present invention, and having two stages in cascade, will have a response time on the order of one and one-half cycles of the input frequency.

It is, therefore, an important object of the present invention to provide a magnetic amplifier having a greatly reduced period of response as measured in terms of input frequency.

Many of the heretofore known magnetic amplifier systems were developed along bridge network lines. Prior to the present invention it was thought necessary in order to cascade successive stages of a magnetic amplifier that each stage be constructed as a bridge network and that the immediately succeeding stage be coupled thereto by coupling the same across the bridge. I have found, however, that improved magnetic amplifier operation may be attained by elimination of the bridge network and certain of the elements heretofore forming parts of the bridge network and by providing each of the stages following the first stage with a pair of reactor control coils magnetically coupled in opposing orientation and connected directly to the output coils of the immediately preceding stage in the manner hereinafter described in detail.

It is therefore another important object of the present invention to provide a magnetic amplifier system of improved and simplified construction having improved operational qualities.

Still another object of the present invention is to provide a magnetic amplifier with cascaded stages directly interconnected and having a bridge networks heretofore thought necessary eliminated therefrom.

Still another important object of the present invention is to provide a magnetic amplifier system of cascaded stages wherein each stage following the first stage is provided with a pair of opposingly oriented control coils each magnetically coupled to each reactor of the preceding stage.

Still another object of the present invention is to provide a new and improved magnetic amplifier system eliminating a number of the heretofore thought necessary electrical components and elements such as certain windings of the reactors, certain bridge elements such as resistors and/or inductors and certain rectifier elements associated with those bridge elements.

Still another object of the present invention is to provide a magnetic amplifier system of cascaded stages wherein the first stage is provided with a control winding magnetically coupled through a pair of closed magnetic circuits with a pair of reactor power windings and wherein each succeeding stage is provided with like parts and an additional control winding similarly coupled into the system but oppositely oriented from the first control winding.

Still another object of the present invention is to provide a magnetic amplifier system wherein each of the reactor windings has a single uni-directional conduction element in series therewith and wherein the control windings of each stage following the first stage and connected in series with the reactor power windings of the immediately preceding stage respectively.

Still another object of the present invention is to provide a new and improved and simplified magnetic amplifier system wherein the single uni-directional conducting element in series with each of the reactor windings in each stage are similarly oriented and wherein the uni-directional coupling elements of each stage are oppositely oriented with respect to the uni-directional conduction elements of adjacent stages.

Still other objects, features and advantages of the present invention will become readily apparent from the following detailed description of the principles of the present invention, and a preferred embodiment thereof, from the appended claim, and from the accompanying single figure of drawing wherein there is schematically illustrated a two stage magnetic amplifier system embodying the principles of the present invention.

In the system shown in the single figure of drawing a magnetic amplifier forming a preferred embodiment of the present invention is comprised of two cascaded stages, identified as a first stage 1 and a second stage 2. These stages are interconnected in a cascade relation and are supplied with power from a common alternating current power source 3.

The first stage of this magnetic amplifier system includes a pair of reactors 5 and 6 each having a closed magnetic circuit defined by the representative ring cores 7 and 8 respectively of magnetic materials having properties causing the reactors 5 and 6 to be operable in accordance with the principles of the present invention. Each of the reactors has a power winding 9 and 10 respectively wound on cores 7 and 8 respectively. That is, the reactor 5 has a core 7 upon which there is wound a reactor power winding 9 and the reactor 6 has a core 8 upon which there is wound a reactor power winding 10.

Magnetically coupled to both of the reactors 5 and 6 and wound upon both closed magnetic loop cores 7 and 8, is a single control winding or coil 11.

The control winding 11 is so inter-related with the reactor power winding 9 and 10, which are also oriented as further described, that a push-pull relation exists between the reactor power windings and the magnetic signal provided by the control winding 11.

The second stage 2, which is representative of each of any desired number of stages following the first stage 1, is substantially identical in construction to the first stage 1. That is, the second and each succeding stage 2 is provided with a pair of reactors 12 and 13 each including closed magnetic circuit loop cores 14 and 15 having wound thereon reactor power windings 16 and 17 respectively. Also, a control winding 18 is wound about the cores of both of the second stage reactors 12 and 13.

In addition to the above described construction for the second and each succeeding stage after the first stage, the stage 2 is provided with a second control coil or winding 19 wound for magnetic opposition and opposing orientation with respect to the first winding 18. The operational features, advantages and characteristics of this inter-relation of the control windings 18 and 19 will be further described herein below, in conjunction with the description of the operational features of this whole embodiment of the present invention.

In accordance with the principles of the present invention it has been found highly desirable to operate each stage of a magnetic amplifier system, and therefore, the magnetic amplifier system as a whole, as a half wave system. By so doing the system is permitted operating characteristics on one-half cycle and flux presetting characteristics on the other half cycle and thereby greatly improving the response time characteristics of the system and greatly reducing the time delay, measurable with respect to the input frequency, through the magnetic amplifier system. To this end, similarly oriented uni-directional conduction elements such as half wave rectifiers or the like, 20 and 21 have been added in series with the reactor windings 9 and 10 respectively of the first stage 1. Similarly, uni-directional conducting elements such as half wave rectifiers or the like 22 and 23 are connected in series with the reactor power windings or coils 16 and 17 respectively of the reactors 12 and 13 and the second and each succeeding stage following the first stage of the magnetic amplifiers system. The rectifier half wave conducting elements 22 and 23 are also similarly oriented for conduction in the same direction and in addition are oppositely oriented with respect to the orientation of the uni-directional conduction elements in adjacent stages such as the elements 20 and 21 in stage 1.

The cascade inter-connection and inter-coupling of successive stages in accordance with the principles of the present invention involves connecting one of the control coils 18 of stage 2 in series with one of the reactor coils 9 and the uni-directional conducting element 20 further in series therewith. This series circuit relation of the coils 9 and 18 and of the half wave rectifier 20 is connected across alternating current power lines 24 and 25 from the source 3. The second stage control coil 19 is connected in series with the reactor winding 10, the other reactor power winding of the first stage 1, and the uni-directional half way rectifier element 21. Both of these series circuits for the described windings are connected to the power source lines 24 and 25 in parallel through a series resistor 26 having a preselected value determinable in accordance with optimum characteristics for the system.

The reactor power windings 16 and 17 of the second stage 2 are also directly connected at one side each thereof to the alternating current power source line 24 and at the other side thereof through the uni-directional conducting elements 22 and 23 respectively to the load and/or succeeding stages and thence to the line 25 at the opposite of the alternating current power supply 3. If cascade coupling is made to succeeding stages then it will be substantially identical to that described herein above for connecting of the control windings 18 and 19 to the power reactor windings 9 and 10 respectively. On the other hand, connection may be made from the second stage 2 or magnetic power amplifier stage of the control system directly to the load. The particular type of load is not critical and may be any signal controlled system such as an electromechanical transducer of any desired characteristics operable to function in accordance with the signal input thereto such as torque motor or the like or a signal control servo-motor system or the like.

The output from the magnetic amplifier system described is an amplification of the input control signal to the control winding 11. In the single figure of drawing the terminals for the control winding 11 of the input stage or voltage amplifier stage 1 have been illustrated as having a control signal impressed thereacross.

In operation, the system of the present invention forms a highly improved and simplified amplifier with cascaded stages. When a control signal is fed to the first stage or voltage amplifier stage the control winding 11 is energized in accordance with that signal. The control signal itself may be an A. C. signal or a D. C. signal as desired. With no signal impressed across the magnetic amplifier first stage control winding 11 the reactor power windings 9 and 10 have equal outputs thereby equally and oppositely energizing the dual control windings 18 and 19 on the second stage. Such equal and opposite energization, or effectively opposite energization results in a cancellation of fluxes from these windings and equal outputs from the reactor power windings 16 and 17 transmittable to the load or to succeeding stages.

When a signal is impressed upon the control winding 11, however, one of the reactors 5 and 6 will fire later than the other or not at all depending upon the amplitude of the control signal. The selection of which of the reactors will fire first is a function of the phase or direction of the input signal. In any event, the input signal will create fluxes in the reactors 5 and 6 causing an unbalance in the outputs of these windings and therefore an unbalance between the fluxes of the control windings 18 and 19 of the second and each succeeding stage of the system.

In a like manner an unbalance between the control windings 18 and 19 results in an unbalance between the outputs of the reactor windings 16 and 17 by varying their relative firing phase position and the amplitude of the conductivity of each thereby providing an output which has a phase variation and amplitude variation determinable as a function of the amplitude and phase or sign of the input signal to the control winding 11.

It will readily be understood from the description of the principles of the present invention that the "self-saturating" rectifier elements 20 and 21 in the first stage and 22 and 23 in the second stage and succeeding stages operate to permit firing and conduction to the several reactor power windings on no more than one half cycle in each stage. By the inclusion of these elements, each stage is provided with a non-conducting "flux setting and flux resetting" half cycle which is the non-conducting half cycle. Through the utilization of these means and through the elimination of bridge network elements and the provision of dual control windings in each stage following the first stage the period of response with respect to the input frequency is reduced to its minimum.

It will be understood, of course, that it is preferred to operate each of the stages of systems embodying the principles of the present invention in a magnetic region substantially close to saturation of the cores of the several reactors thereby providing high gain qualities to the magnetic amplifier system. By operating each of the cores of the several reactors in the vicinity of saturation or immediately therebelow and by orienting the reactor coils of each stage with respect to each other and with respect to the control winding in such a manner that each stage operates in a magnetic push-pull, the output of each stage and of the magnetic amplifier will be directly controlled and the output will be a predeterminable function of the input control signal.

It will also be understood that dual control winding magnetic amplifier stages such as stage 2 of the system hereinabove described and illustrated in the accompanying drawing are independently operable and controllable from a control signal source wherein it is desirable to amplify unbalance conditions and the like. However, signal amplification of greater power and magnitude may be attained by cascading in accordance with the principles of the present invention.

It will be readily observed that numerous variations and modifications may be made without departing from the true spirit and scope of the novel concepts and principles of the present invention. I, therefore, intend by the appended claim to cover all such modifications and variations as fall within the true spirit and scope of the principles and novel concepts of this invention.

I claim as my invention:

In a magnetic amplifier network having reduced time delay characteristics and directly coupled cascaded stages, in combination; a first amplifier stage including a pair of reactor power windings, a control winding magnetically coupled to said power windings in a manner whereby said power windings maintain a magnetic push-pull interrelation with said control winding and each other, and a uni-directional conduction element in series with each of said power windings, said elements being similarly oriented; a second amplifier stage including a pair of reactor windings and a first control winding and further including a second control winding oriented in opposition to the first control winding of said second stage, uni-directional conduction elements in said second stage oriented oppositely to the elements of said first stage, means connecting the first control winding of said second stage in series with one of the power windings of the first stage and means connecting the second control winding of the second stage in series with the other power winding of the first stage.

References Cited in the file of this patent

UNITED STATES PATENTS

| | | |
|---|---|---|
| 2,554,203 | Morgan | May 22, 1951 |
| 2,636,150 | McKenney et al. | Apr. 21, 1953 |
| 2,688,723 | Kadushin et al. | Sept. 7, 1954 |